J. C. MILLER.
FOOD PRODUCT OBTAINED FROM BREWERS' YEAST.
APPLICATION FILED MAR. 19, 1918.
1,391,561.
Patented Sept. 20, 1921.
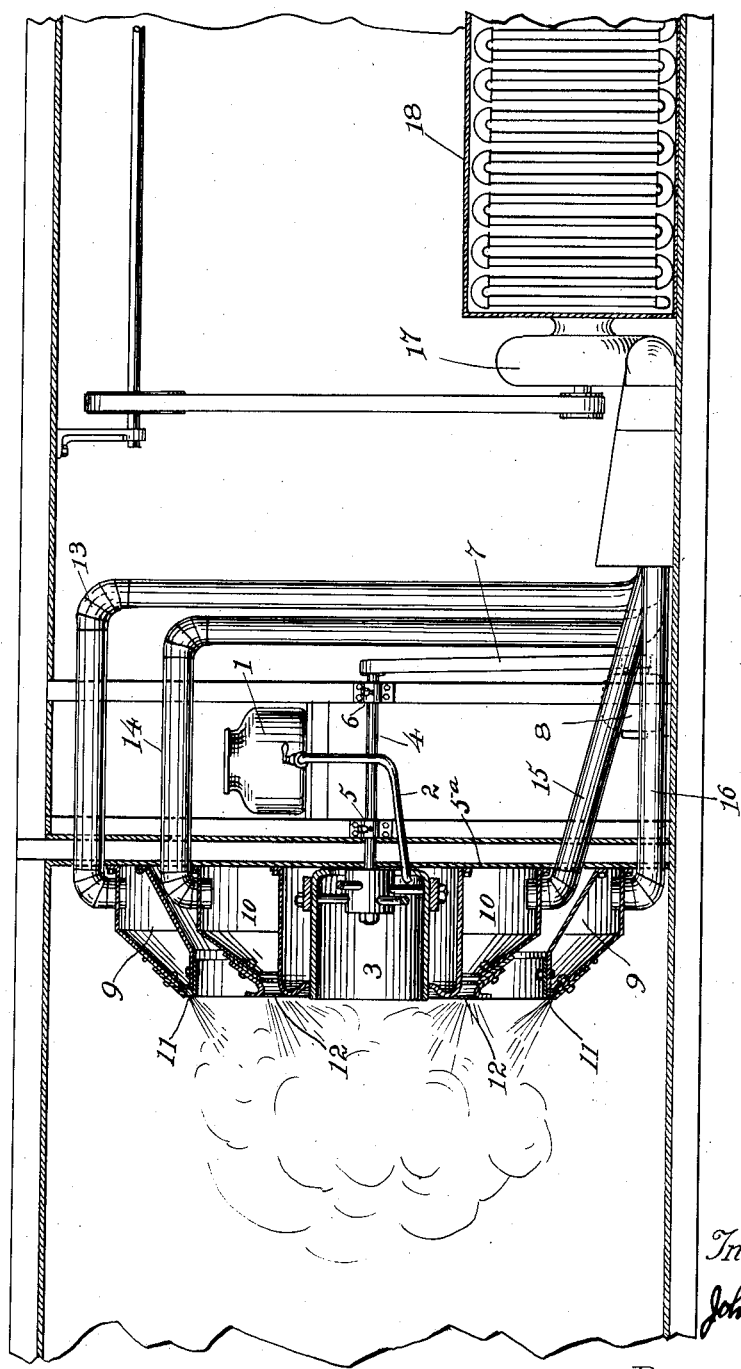
Inventor:
John C. Miller
By Allen & Allen
Attorneys.

UNITED STATES PATENT OFFICE.

JOHN C. MILLER, OF COVINGTON, KENTUCKY, ASSIGNOR TO THE EVAPORATING AND DRYING MACHINERY COMPANY, OF CINCINNATI, OHIO, A CORPORATION OF OHIO.

FOOD PRODUCT OBTAINED FROM BREWERS' YEAST.

1,391,561.  Specification of Letters Patent.  Patented Sept. 20, 1921.

Application filed March 19, 1918. Serial No. 223,260.

*To all whom it may concern:*

Be it known that I, JOHN C. MILLER, a citizen of the United States, and a resident of Covington, in the county of Kenton and State of Kentucky, have invented certain new and useful Improvements in Food Products Obtained from Brewers' Yeast, of which the following is a full, clear, and exact description, reference being had to the accompanying drawing, forming part of this specification.

Brewers' waste yeast when dried has for some years been utilized for a force feed for animals. When analyzed, the dried brewers' yeast contains, on an average, about fifty-four per cent. crude protein, twenty-five per cent. nitrogen free extract, two per cent. crude fat and ten per cent. ash and fiber.

I have discovered that when properly prepared, a flour can be obtained from the brewers' waste yeast which can be effectively and properly used when mixed with wheat flour, or when used by itself, as a food product for human consumption.

In the processes heretofore employed in drying brewers' yeast, the material has been dried on steam heated rollers and scraped therefrom by scraping knives, which renders the material coarse and gritty. The older dried products have never been suitable for use either as a substitute for or when mixed with wheat flour for human consumption.

In preparing my product, the wet material in the preferred apparatus is delivered into a rapidly rotating cylinder from which it is discharged by centrifugal force at the delivery end of the cylinder in the form of a very fine annular spray and is there subjected to a current of heated air, which is blown annularly across the centrifugally discharged material, so that the moisture is very rapidly taken up and the material can be readily collected in the form of a dry powder free from grit and in the condition of a flour.

Any suitable apparatus may be employed for removing the moisture, but I have found the apparatus indicated in the accompanying drawing very well suited for the purpose.

In the drawing, the figure is a central vertical section of my drying apparatus.

The material to be treated previously condensed if necessary as above stated is delivered from a suitable container 1 to pipe 2 into the inside of a cylinder 3 open at the delivery end, and this cylinder is mounted on a horizontal shaft 4, suitably journaled in supports 5 and 6. The cylinder is preferably mounted on the inside of the wall 5ª of the desiccating chamber, and it will be understood that a suitable chamber is provided which is closed on all sides for the reception of the dry material. The cylinder 3 is in the construction illustrated rotated at a very high rate of speed by the driving belt 7 through an electric motor. Surrounding the cylinder 3 and fixed to the wall of the desiccating chamber are preferably arranged a series of annular compartments 9 and 10, the discharge from which compartments comprise a narrow annular opening 11, 12, surrounding the cylinder. Into these compartments by a series of pipes 13, 14, 15 and 16, I discharge heated air from a blower indicated at 17, the air being passed over radiators or heaters 18, and the temperature of the air is maintained at about 155° F. and upward or at such other temperatures as may be necessary.

The cylinder 3 is rotated at a very high rate of speed, which causes the wet material delivered to the pipe 2 to be discharged as a cone-shaped spray, while the heated air is discharged substantially at right angles across this body of spray, so that the material is reduced to a dry powder.

By adopting a temperature of at least 155° F. for the hot air, not only is a flourlike powder obtained without grit and as soft and smooth as finely bolted wheat flour, but the peptones present in the protoplasm of the yeast cells are liberated, and the product becomes a substitute for wheat and other flour in cooking, and it can also be very effectively used when mixed with wheat flour for all the purposes to which such flour is now put in cooking.

Having thus described my invention, what I claim as new and desire to secure by Letters Patent, is:—

1. A new food product made from brewers' yeast, comprising an unground flour free from grit, containing upward of fifty per cent. protein with the yeast cells substantially disintegrated and the peptones liberated therefrom.

2. A new food product made from brewers' yeast, comprising an unground flour free from grit, containing substantially fifty-four per cent. of protein, twenty-five per cent. nitrogen free extract, two per cent. crude fat and ten per cent. ash and fiber.

JOHN C. MILLER.